3,119,736
HALO-NITROANILINE FUNGICIDES
Nigel G. Clark, Herbert A. Stevenson, Robert F. Brookes, and Anthony F. Hams, all of Nottingham, England, assignors to Boots Pure Drug Company Limited, Nottingham, England, a British company
No Drawing. Filed Sept. 10, 1958, Ser. No. 760,085
Claims priority, application Great Britain Sept. 17, 1957
6 Claims. (Cl. 167—30)

This invention relates to new compositions which have been found to possess valuable fungicidal properties. The term "fungicide" as used throughout the specification is not to be given its strictly scientific meaning but is intended to mean "capable of controlling the growth of fungi."

Plant pathogenic fungi can in many instances cause considerable loss of agricultural and horticultural crops. Many compounds are in current use for controlling such fungi, thereby preventing the loss of valuable crops. As an example the fungus *Botrytis cinerea* attacks lettuce and several compounds have been used in an attempt to control it. Formulations based on compounds such as tetrachloronitrobenzene are widely used to control *Botrytis cinerea* on lettuce under glass in the U.K. and whilst they are effective up to a point they have certain deficiencies. For example tetrachloronitrobenzene lacks persistence due to its high volatility and has not proved effective as a wet spray on outdoor crops. Furthermore, tetrachloronitrobenzene and other commercially available fungicidal compounds, e.g. tetramethylthiuramdisulphide and pentachloronitrobenzene, particularly if used in excess of the recommended field dose, are liable to cause considerable check to the growth of the crops.

It is an object of the present invention to provide novel fungicidal compositions and methods of controlling the growth of fungi using these novel compositions, which compositions are more effective than hitherto known fungicides, particularly for controlling the Botrytis species of fungus. It is a further object of this invention to provide novel fungicidal compositions which combine the desired properties of low volatility and low phytotoxicity with high fungicidal activity.

The invention consists in compositions for use in agriculture and horticulture which comprise as active ingredient a compound of the general formula:

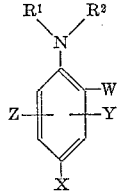

in which $R^1$ represents a hydrogen atom or a lower alkyl or acyl radical, $R^2$ represents a hydrogen atom or a lower alkyl radical, W and X represent halogen or nitro, alkyl or alkoxy groups, and Y and Z represent hydrogen, halogen or nitro groups, provided that at least one and no more than three of W, X, Y and Z represent a nitro group, in association with a diluent or carrier.

We have found that dusts, dispersions, emulsions, smokes and aerosols which contain as active ingredient a compound of the above general formula have properties which render them valuable for the control of fungi, for example *Botrytis cinerea*, *Botrytis tulipae*, *Pythium debaryanum*, *Corticium solani*, *Plasmopara viticola* and *Phytophthora infestans*. Our invention consists therefore, in dusts, dispersions, emulsions, smokes and aerosols which contain as active ingredient a compound of the above general formula and which may be used for agricultural and horticultural purposes. The compositions of this invention are useful in preventing fungi from establishing themselves on crops and also in preventing the fungi from growing after infestation of the crops has already occurred.

In this specification the term "crops" includes the growing agricultural and horticultural plant, e.g. lettuce growing in a lettuce bed or the crop which has been harvested e.g. potatoes.

Our invention also consists in the use of fungicidal compositions containing as active ingredient a compound of the above general formula for agricultural and horticultural purposes.

In the following list there are shown typical compounds which may be employed in the compositions of the invention, but it is to be understood that the invention is not limited to compositions containing as active ingredient only these compounds.

2:4-dichloro-6-nitroaniline.
2:6-dichloro-4-nitroaniline.
2:4:6-trichloro-3-nitroaniline.
6-bromo-4-chloro-2-nitroaniline.
6-chloro-2:4-dinitroaniline.
2-bromo-6-chloro-4-nitroaniline.
4-bromo-6-chloro-2-nitroaniline.
4:6-dichloro-N-methyl-2-nitroaniline.
2:6-dichloro-N-methyl-4-nitroaniline.
2:6-dichloro-N:N-dimethyl-4-nitroaniline.
4-chloro-2-nitroaniline.
4-chloro-2-nitroacetanilide.
2-methyl-4-nitroaniline.
2-methoxy-4-nitroaniline.
4-methoxy-2-nitroaniline.
4-methoxy-2-nitroacetanilide.
2-bromo-4-nitroaniline.
4-bromo-2-nitroaniline.
2-chloro-N:N-dimethyl-4-nitroaniline.
2-chloro-4-nitroaniline.
2-chloro-N-methyl-4-nitroaniline.
4-methyl-2-nitroaniline.
4-methyl-2-nitroacetanilide.
6-chloro-2-methyl-4-nitroaniline.
6-chloro-2-methoxy-4-nitroaniline.
4-chloro-N-methyl-2-nitroaniline.
4-chloro-N:N-dimethyl-2-nitroaniline.
2:4-dinitroaniline.
2:4:6-trinitroaniline.
2:6-dibromo-4-nitroaniline.
2:4-diiodo-4-nitroaniline.

The dispersions having a solid dispersed phase according to the invention may comprise an active ingredient of the above general formula in combination with a dispersing agent and/or a suspending agent in aqueous medium. For convenience the preparation may consist of the active ingredient admixed with a dispersing agent and/or suspending agent such that a dispersion is formed when the mixture is added to water. To facilitate the formation of a dispersion in this manner the preparation to be diluted may also contain a water-miscible solvent, for example, acetone. The dispersions according to the invention also include suspensions in which the solid dispersed phase in water is admixed with an aqueous-oil emulsion, the active ingredient being substantially insoluble in the oil, thereof, which oil is preferably a non-volatile oil, for example, liquid paraffin.

The emulsions according to the invention may comprise an active ingredient of the above general formula in combination with an emulsifying agent and an organic solvent, for example xylene or an aromatic solvent boiling within the range 80–300° C. It may be advantageous to add a non-volatile vegetable or mineral oil such as liquid paraffin to act as an activator and/or sticker. The emulsion composition according to the invention may also contain a wetting agent. For convenience the composition may consist of the active ingredient with or in solution in an organic solvent together with an emulsifying agent, and if desired, a wetting agent such that an emulsion is formed on admixing the composition with water. Such compositions also form part of the present invention. The aqueous dispersions and emulsions herein described may be diluted with water before application to obtain a final concentration of the active ingredient within the range 0.001–10% w./v. but the invention is not limited to compositions which contain this concentration of the active ingredient; the concentrations of the solutions which are employed depends upon the requirements of the particular spraying machine which is to be used.

Dispersions of the active ingredient in which the carrier is a pulverulent solid diluent form part of the present invention. Such dispersions may contain up to 50% w./w. of active ingredient.

We have found that it is possible to employ the compounds of the above general formula in the form of smokes and aerosols. This method of application is very convenient when the plants, which it is desired to treat for the control of fungi, are located in an enclosed area, for example, in a greenhouse.

Accordingly our invention also comprises compositions for the preparation of fungicidal smokes and aerosols which contain as active ingredient a compound of the above general formula.

In the preparations of compositions suitable for dispersion as aerosols which contain as active ingredient compounds of the above general formula, the active ingredient may be dissolved in a volatile solvent such as acetone. Alternatively the active ingredient may be dissolved in a high boiling aromatic solvent such as xylene or a non-volatile oil such as vegetable oil, together with a supplementary solvent such as cyclohexanone or acetone if desired. Such compositions are readily dispersed as aerosols either by mechanical means or by incorporating therein a volatile propellant such as Freon (a mixture of chlorfluoro derivatives of methane and ethane).

Compositions suitable for the generation of fungicidal smokes, comprise a compound of the above general formula in association with an ignitable slow burning composition such that a smoke containing the active ingredient is generated on ignition.

We have found that compositions which contain as active ingredient a compound of the above general formula are particularly valuable for the control of soil-borne fungi, such as *Botrytis cinerea, Pythium debaryanum* and *Corticium solani*. Thus, for example, a fungicidal dust according to the invention may be applied to the soil before planting of crop plants, such as lettuce, and at regular intervals following planting the dust may be applied to and around the plants. This programme gives protection to the plant throughout its whole life as the compound is not capable of eradicating the disease once it has penetrated into the plant. Such treatment prevents the pathological conditions known as "grey-mould" and "damping-off," which are caused by the aforementioned fungi. Thus we have found that the growth of *Botrytis cinerea* on lettuce may be controlled by applying to the lettuce beds 2:6-dichloro-4-nitroaniline at a rate of 1/16–2 grams per square yard. This treatment may be carried out conveniently by applying a dust containing the active ingredient in association with an inert diluent, for example, talc. The concentration of active ingredient in the dust is not critical; some growers prefer to use a 4% w./w. dust, which may be applied at a rate of approximately 1/16–2 ounces per square yard, others prefer to use an 8% w./w. dust which may be applied at a rate of approximately 1/32–1 ounce per square yard of bed.

The compositions of the invention may be used to control Botrytis rot on strawberries, downy mildew (*Plasmopara viticola*) and Botrytis rot on grapes and tulip fire (*Botrytis tulipae*) on tulips.

Thus, for example, an aqueous dispersion containing 0.01–0.4% w./w. of 2:6-dichloro-4-nitroaniline may be sprayed on to these plants to "run off" in order to control the aforementioned fungi.

Fungicidal dusts according to the invention have also been found to be valuable for the control of storage rot in potato clamps, caused by such organisms as *Fusarium caeruleum, Phoma foveata* and *Pythium debaryanum*. Thus dusts according to the invention containing as active ingredient 2:6-dichloro-4-nitroaniline or 2:4-dichloro-6-nitroaniline, when applied to potatoes in storage clamps at rates of 0.1–1.6 lbs. of active ingredient per ton of potatoes, have been found to control storage rot.

The compositions of the invention may contain as active ingredient more than one compound of the above general formula. Thus it may be advantageous to use as active ingredient a mixture of two or more of the aforesaid substances, one component possessing extremely high fungicidal activity against one fungus and the other component possessing high fungicidal activity against a second fungus.

For example it has been found that the compound 2:6-dichloro-4-nitroaniline possesses very high fungicidal activity against *Botrytis cinerea*, but lower activity against *Pythium debaryanum* and *Corticium solani*. However 2-chloro-4-nitroaniline has been found to be extremely active against the two latter fungi, but relatively inactive against *Botrytis cinerea*. Hence a composition according to the invention containing a mixture of both these compounds as active ingredient possesses a wider and more useful fungicidal spectrum than a composition containing as active ingredient either one compound alone.

The compositions of the invention may contain, in addition to one or more compounds of the above general formula, other compounds known to possess fungicidal, insecticidal or sprout-inhibiting properties.

The compounds which are employed as active ingredients in the compositions of the invention have been demonstrated to possess fungicidal activity in tests carried out in the following manner:

1. IMPREGNATION TESTS

In this test agar plates are prepared in which the agar contains the substance under test at a concentration of 10 parts per million, the substance being introduced into the hot agar from an acetone solution before the plate is poured. The centre of each plate is inoculated with *Botrytis cinerea* and the plates are incubated; the size of the colony is measured diametrically at 3 days intervals and is compared with untreated controls. The results are expressed as follows:

$$\text{Percent control} = \frac{\text{Diameter of control colony} - \text{Diameter of treated colony}}{\text{Diameter of control colony}} \times 100$$

Similar tests are carried out employing concentrations of substances under test in agar of 5, 2.5 and 1 parts per million.

2. DAMPING-OFF FUNGI TRIALS

In this test cubes of agar containing mycelium of either *Pythium debaryanum* or *Corticium solani* are coated with dusts containing 0.5% w./w. of the substance under test in kaolin and placed in the centre of agar plates. A measure of the activity of the compounds under test is obtained by comparison of the diameter of the colonies with the diameter of colonies produced by untreated agar cubes.

The activity is expressed as follows:

$$\text{Percent control} = \frac{\text{Diameter of control colony} - \text{Diameter of treated colony}}{\text{Diameter of control colony}} \times 100$$

The results of tests 1 and 2 are shown in Table 1, wherein P.d. represents *Pythium debaryanum* and C.s. represents *Corticium solani*.

3. BOTRYTIS ROT OF STRAWBERRIES

The efficiency of 2:6-dichloro-4-nitroaniline in controlling Botrytis rot of strawberries has been demonstrated by the following procedure.

Twenty strawberries were dipped into an aqueous suspension of 2:6-dichloro-4-nitroaniline. The treated strawberries were placed in damp chambers, sprayed with an aqueous suspension of spores of *Botrytis cinerea* and maintained at room temperature. The strawberries were examined at intervals and the number showing signs of rot was noted. In a similar manner, 20 untreated strawberries were artificially infected with *Botrytis cinera* in order to provide a control.

The results of two tests are shown in Table II.

4. "TULIP FIRE" CAUSED BY *BOTRYTIS TULIPAE*

In this test tulips, varieties Bartigon and William Pitt, were grown in boxes, 50 plants per box. After planting of the bulbs in October, the boxes were kept in a cold frame until the following February, when they were transferred into the greenhouse.

*Table I*

| Compound | Impregnation test | | | | Damping-off fungi | |
|---|---|---|---|---|---|---|
| | 10 p.p.m. | 5 p.p.m. | 2.5 p.p.m. | 1 p.p.m. | P.d. | C.s. |
| 2:4-dichloro-6-nitroaniline | 100 | 98 | 83 | 44 | 4 | 0 |
| 2:6-dichloro-4-nitroaniline | 100 | 86 | 71 | 42 | 2 | 0 |
| 2:4:6-trichloro-3-nitroaniline | 92 | 82 | 68 | 29 | 6 | 65 |
| 6-bromo-4-chloro-2-nitroaniline | | 84 | 72 | 52 | 0 | 100 |
| 6-chloro-2:4-dinitroaniline | 86 | 79 | 42 | | 100 | 30 |
| 2-bromo-6-chloro-4-nitroaniline | 100 | 98 | 77 | 47 | 37 | 29 |
| 4-bromo-6-chloro-2-nitroaniline | | 80 | 63 | | 5 | 65 |
| 4:6-dichloro-N-methyl-2-nitroaniline | | 82 | 58 | 37 | 38 | 100 |
| 2:6-dichloro-N-methyl-4-nitroaniline | | 81 | 58 | 40 | 83 | 100 |
| 2:6-dichloro-N:N-dimethyl-4-nitroaniline | | 68 | 17 | | 0 | 100 |
| 4-chloro-2-nitroaniline | | 52 | 4 | | 100 | 100 |
| 4-chloro-2-nitroacetanilide | | 14 | | | 100 | 71 |
| 2-methyl-4-nitroaniline | 10 | | | | 100 | 32 |
| 2-methoxy-4-nitroaniline | 13 | | | | 100 | 27 |
| 4-methoxy-2-nitroaniline | 23 | | | | 100 | 0 |
| 4-methoxy-2-nitroacetanilide | 12 | | | | 100 | 0 |
| 2-bromo-4-nitroaniline | 71 | 47 | | | 100 | 0 |
| 4-bromo-2-nitroaniline | | 24 | | | 100 | 100 |
| 2-chloro-N:N-dimethyl-4-nitroaniline | | 16 | | | 30 | 100 |
| 2-chloro-4-nitroaniline | | 16 | | | 92 | 100 |
| 2-chloro-N-methyl-4-nitroaniline | | 37 | | | 28 | 100 |
| 4-methyl-2-nitroaniline | | 5 | | | 46 | 71 |
| 4-methyl-2-nitroacetanilide | | 50 | | | 62 | 0 |
| 6-chloro-2-methyl-4-nitroaniline | 67 | 45 | | | 68 | 0 |
| 6-chloro-2-methoxy-4-nitroaniline | | 23 | | | 46 | 29 |
| 4-chloro-N-methyl-2-nitroaniline | | 33 | | | 40 | 68 |
| 4-chloro-N:N-dimethyl-2-nitroaniline | | 21 | | | 66 | 20 |
| 2:4-dinitroaniline | | 20 | | | 100 | 66 |
| 2:4:6-trinitroaniline | 100 | 55 | 24 | | 100 | 0 |
| 2:6-dibromo-4-nitroaniline | 100 | 78 | 49 | | 1 | 1 |
| 2:6-diiodo-4-nitroaniline | 64 | 52 | 39 | | 1 | 0 |

*Table II*

| Trial No. | Treatment concentration of 2:6-dichloro-4-nitroaniline (% weight) | No. of strawberries rotting x days after treatment | | | | |
|---|---|---|---|---|---|---|
| | | x=3 | x=4 | x=6 | x=7 | x=8 |
| 1 | 0.1 | 0 | 1 | 2 | — | — |
| | Control | 4 | 9 | 10 | — | — |
| 2 | 0.1 | 0 | — | — | 1 | 1 |
| | 0.05 | 1 | — | — | 2 | 3 |
| | Control | 4 | — | — | 8 | 8 |

NOTE.—A dash indicates that no examination was carried out.

24 days after being transferred to the greenhouse the tulips were sprayed to run off with aqueous suspensions of the compounds under test, 3 boxes being used for each separate treatment, and 3 control boxes being given no treatment. Subsequently the tulips were sprayed again with similar aqueous suspensions 37, 50 and 64 days after being brought into the greenhouse. The tulips were examined after intervals for signs of "tulip fire," and the number of flowers was noted. Finally when flowering was complete, the bulbs were lifted and a note taken of the number of bulbs infected with *Botrytis tulipae*.

The degree of "tulip fire" infection was recorded using an arbitrary "scoring" method in which the boxes are given a "score" based on the following scale.

4—Leaves severely spotted, iwth sporing lesions breaking out all over the leaves.
3—Leaves badly spotted with occasional sporing lesion.
2—Moderate spotting of leaves.
1—Slight spotting of leaves.
½—Very slight spotting of leaves.
0—No spotting, leaves absolutely clear.

The scores given to individual boxes of tulips for each treatment applied to three boxes were added, giving a total score.

This total score is a measure of the degree of infection of each set of three boxes of plants, and is the figure shown in the columns headed "grading of disease" in Table III.

5. BOTRYTIS CINEREA ON LETTUCE

The efficacy of 2:6-dichloro-4-nitroaniline for the control of *Botrytis cinerea* has been demonstrated in a trial carried out as follows.

Lettuces were planted out on October 21 in randomised plots in a cold Dutch light, 35 plants per plot. Four plots were used for each treatment as follows:

*Treatment 1.*—Immediately before planting of the lettuces, the soil was dusted at a rate of ½ ounce/square yard with a dust containing 1% w./w. of 2:6-dichloro-4-nitroaniline.

*Table III*

| Treatment | Concentration of aqueous dispersion employed, percent by weight | Grading of disease 57 days after transfer of plants to greenhouse | |
|---|---|---|---|
| | | Bartigon | William Pitt |
| 2:4-dichloro-6-nitroaniline | 0.2 | 1 | 3½ |
| 2:6-dichloro-4-nitroaniline | 0.2 | 0 | 2½ |
| Control | | 4½ | 5 |

*Table III—Continued*

| Treatment | Grading of disease 71 days after transfer of plants to greenhouse | | Total number of flowers 84 days after transfer of plants to greenhouse | | Percent infection of lifted bulbs | |
|---|---|---|---|---|---|---|
| | Barti-gon | William Pitt | Barti-gon | William Pitt | Barti-gon | William Pitt |
| 2:4-dichloro-6-nitroaniline | ½ | 1 | 99 | 89 | 19 | 50 |
| 2:6-dichloro-4-nitroaniline | 0 | 1 | 92 | 81 | 19 | 25 |
| Control | 6 | 6 | 81 | 74 | 12 | 62 |

*Treatment 2.*—As treatment 1 but employing a 2% w./w. dust.

*Treatment 3.*—As treatment 1, employing a 4% w./w. dust.

*Treatment 4.*—The soil was not treated prior to the planting of the lettuces. The beds of lettuces were treated at a rate of ¼ ounce/square yard with a dust containing 1% w./w. of 2:6-dichloro-4-nitroaniline on November 6, December 5 and January 7.

*Treatment 5.*—As treatment 4, using a 2% w./w. dust.
*Treatment 6.*—As treatment 5, using a 4% w./w. dust.
*Treatment 7.*—No treatment—control.

The effect of the treatments on the lettuces was assessed by noting the number of surviving plants on February 10 and the number of marketable lettuces on March 4. The results are shown in Table IV.

*Table IV*

| Treatment | Percent survival of lettuces, 10th February | Percent of marketable lettuces, 4th March |
|---|---|---|
| 1 | 62 | 29 |
| 2 | 73 | 38 |
| 3 | 92 | 63 |
| 4 | 90 | 63 |
| 5 | 96 | 88 |
| 6 | 99 | 94 |
| 7 | 68 | 34 |

6. POTATO STORAGE ROT

Potatoes were formed into storage clamps each containing 2 cwt. and the clamps were subjected to the following treatments.

*Treatment 1.*—Dust containing 2% w./w. of 2:6-dichloro-4-nitroaniline.
*Treatment 2.*—Dust containing 4% w./w. of 2:6-dichloro-4-nitroaniline.
*Treatment 3.*—Dust containing 2% w./w. of 2:4-dichloro-6-nitroaniline.
*Treatment 4.*—Dust containing 4% w./w. of 2:4-dichloro-6-nitroaniline.
*Treatment 5.*—Control—no treatment.

The dusts were applied to the potatoes during the building of the clamps at a rate of 10 lbs./ton. The clamps were examined at intervals and at the end of the storage time, an assessment was carried out of the amount of rot in each clamp. The results obtained were as follows in Table V.

*Table V*

Treatment: Percent rot
1 ------------------------------------------ 9.4
2 ------------------------------------------ 9.7
3 ------------------------------------------ 15.6
4 ------------------------------------------ 12.9
5 ------------------------------------------ 36

The following non-limitative examples illustrate the invention.

EXAMPLE 1

In the preparation of a dispersible powder, 20 parts by weight of 2:6-dichloro-4-nitroaniline is intimately mixed with 8 parts by weight of Belloid T.D. (a condensate of formaldehyde and an alkyl aryl sulphonate) and 72 parts by weight of kaolin. This composition may be added to water to form a dispersion suitable for horticultural use.

EXAMPLE 2

In the preparation of a fungicidal dust 4 parts by weight of 2:6-dichloro-4-nitroaniline is intimately mixed with 96 parts by weight of kaolin.

EXAMPLE 3

In the preparation of a dispersible powder, 25 parts by weight of 2:6-dichloro-4-nitroaniline is intimately mixed with 5 parts by weight of sulphite lye, 8.5 parts by weight of Nansa S (the sodium salt of an alkylarylsulphonic acid) and 61.5 parts by weight of kaolin. This composition may be added to water to form a dispersion suitable for horticultural use.

EXAMPLE 4

In the preparation of a fungicidal dust 4 parts by weight of 2:6-dichloro-4-nitroaniline is intimately mixed with 1 part by weight of magnesium stearate, 58 parts by weight of kaolin and 37 parts by weight of gypsum.

EXAMPLE 5

In the preparation of a dispersible powder, 50 parts by weight of 2:6-dichloro-4-nitroaniline is intimately mixed with 10 parts by weight of sulphite lye, 17 parts by weight of Nansa S and 23 parts by weight of kaolin. This composition may be added to water to form a dispersion suitable for horticultural use.

EXAMPLE 6

In the preparation of a fungicidal dust, 3 parts by weight of 2:6-dichloro-4-nitroaniline and 1 part by weight of 2-chloro-4-nitroaniline are intimately mixed with 96 parts by weight of kaolin.

Compositions similar to those described in Examples 1, 2, 3, 4, 5 and 6 may be prepared in which the active ingredient specifically mentioned is replaced by one or more of the compounds previously listed.

EXAMPLE 7

In the preparation of a composition suitable for dilution with water to produce a stable emulsion, sufficient 2:4-dichloro-6-nitroaniline is dissolved in a mixture of 10 parts by volume of Ethylan S.E. (a proprietary emulsifying agent which is a mixture of lauric diethanolamide and a polyethylene oxide condensate of octylphenol) and 90 parts by volume of toluene to obtain a solution which contains 5% w./v. of active ingredient.

Similar compositions may be prepared in which 2:4-dichloro-6-nitroaniline is replaced by one of the following components:

2:4:6-trichloro-3-nitroaniline.
4-methyl-2-nitroacetanilide.
4-chloro-2-nitroacetanilide.
6-bromo-4-chloro-2-nitroaniline.
4-bromo-6-chloro-2-nitroaniline.
4-chloro-N-methyl-2-nitroaniline.
2-chloro-N:N-dimethyl-4-nitroaniline.
4:6-dichloro-N-methyl-2-nitroaniline.
4-chloro-N:N-dimethyl-2-nitroaniline.
2:6-dichloro-N-methyl-4-nitroaniline.
2:6-dichloro-N:N-dimethyl-4-nitroaniline.

EXAMPLE 8

In the preparation of a composition suitable for dispersion as an aerosol sufficient 2:6-dichloro-4-nitroaniline is dissolved in acetone to obtain a solution which contains 3% w./v. of active ingredient.

Similar compositions may be prepared in which 2:6- dichloro-4-nitroaniline is replaced by one of the following compounds:

2:4:6-trichloro-3-nitroaniline.
4-methyl-2-nitroaniline.
4-methyl-2-nitroacetanilide.
4-chloro-2-nitroaniline.
4-chloro-2-nitroacetanilide.
6-bromo-4-chloro-2-nitroaniline.
2-methyl-4-nitroaniline.
2-methoxy-4-nitroaniline.
4-methoxy-2-nitroacetanilide.
6-chloro-2:4–dinitroaniline.
2-bromo-4-nitroaniline.
6-chloro-2-methoxy-4-nitroaniline.
4-bromo-2-nitroaniline.
4-bromo-6-chloro-2-nitroaniline.
4-chloro-N-methyl-2-nitroaniline.
2-chloro-N:N-dimethyl-4-nitroaniline.
4:6-dichloro-N-methyl-2-nitroaniline.
2-chloro-4-nitroaniline.
2-chloro-N-methyl-4-nitroaniline.
4-chloro-N:N-dimethyl-2-nitroaniline.
2:6-dichloro-N-methyl-4-nitroaniline.
2:6-dichloro-N:N-dimethyl-4-nitroaniline.

These compositions are readily dispersed as aerosols by mechanical means, for example, by use of a paint spray gun.

We claim:

1. A fungicidal composition adapted for control of pathogenic plant fungi comprising as an active ingredient a fungicidally effective amount of at least one compound selected from the group consisting of 2:4-dichloro-6-nitroaniline, 6-bromo-4-chloro-2-nitroaniline, 2:6-dichloro-4-nitroaniline and 2-bromo-6-chloro-4-nitroaniline in association with a dispersing agent as a fungicidal adjuvant.

2. A fungicidal composition adapted for control of pathogenic plant fungi comprising as an active ingredient a fungicidally effective amount of at least one compound selected from the group consisting of 2:4-dichloro-6-nitroaniline, 6-bromo-4-chloro-2-nitroaniline, 2:6-dichloro-4-nitroaniline and 2-bromo-6-chloro-4-nitroaniline in association with an emulsifying agent as a fungicidal adjuvant.

3. A fungicidal composition adapted for application as a dust for control of pathogenic plant fungi which when applied to and around crops is effective not only to effect deposition on the upper surfaces but also to effect deposition on under surfaces of said crops and the soil comprising as an active ingredient a fungicidally effective amount of at least one compound selected from the group consisting of 2:4-dichloro-6-nitroaniline, 6-bromo-4-chloro-2-nitroaniline, 2:6-dichloro-4-nitroaniline, and 2-bromo-6-chloro-4-nitroaniline in association with from 50 to 99.5 percent of a dusting powder as a fungicidal adjuvant in a solid dusting composition.

4. A method of controlling pathogenic plant fungi on a crop which comprises applying to the surface of the soil in which the crop is to grow a composition comprising as an active ingredient a compound selected from the group consisting of 2:4-dichloro-6-nitroaniline, 6-bromo-4-chloro-2-nitroaniline, 2:6-dichloro-4-nitroaniline and 2-bromo-6-chloro-4-nitroaniline.

5. The method of controlling pathogenic plant fungi on crops which comprises applying a solid dust composition comprising 50 to 99.5 percent of a dusting powder as a fungicidal adjuvant and a fungicidally effective amount of at least one compound selected from the group consisting of 2:4-dichloro-6-nitroaniline, 6-bromo-4-chloro-2-nitroaniline, 2:6-dichloro-4-nitroaniline, and 2-bromo-6-chloro-4-nitroaniline to and around said crop so as to effect deposition of the active ingredient on under as well as upper surfaces thereof and on the soil.

6. A method of controlling pathogenic plant fungi on a crop which comprises applying to the surface of the crop a composition comprising as an active ingredient a compound selected from the group consisting of 2:4-dichloro-6-nitroaniline, 6-bromo-4-chloro-2-nitroaniline, 2:6-dichloro-4-nitroaniline and 2-bromo-6-chloro-4-nitroaniline.

References Cited in the file of this patent

UNITED STATES PATENTS 1,947,926 Steindorff -------------- Feb. 20, 1934

OTHER REFERENCES

Chem. Abs., 35, 1777 (1); 31, 2835 (8); 40, 7178 (3) (1946).

Frear: A Catalogue of Insecticides and Fungicides, vol. 2, p. 27, 1948, Chronica Botanica Comp.

Plant Disease Reporter, Supp., No. 182, Mar. 30, 1949, pp. 89, 90 and 95.